United States Patent [19]

Rios et al.

[11] Patent Number: 5,207,500
[45] Date of Patent: May 4, 1993

[54] MOTORCYCLE HELMET WITH HEADLIGHTS

[76] Inventors: Obdulio Rios, 14 Bogardus Pl., New York, N.Y. 10040; George Spector, 233 Broadway Rm. 3815, New York, N.Y. 10007

[21] Appl. No.: 749,968

[22] Filed: Aug. 26, 1991

[51] Int. Cl.$^5$ .................. F21V 33/00; F21L 15/14
[52] U.S. Cl. ............................ 362/105; 362/72; 362/106; 340/475
[58] Field of Search ............... 362/72, 103, 105, 106, 362/253; 340/432, 464, 475, 479; 439/677, 679, 680

[56] References Cited

U.S. PATENT DOCUMENTS

| | | | |
|---|---|---|---|
| 4,195,328 | 3/1980 | Harris, Jr. | 362/72 |
| 4,420,209 | 12/1983 | Reis et al. | 439/677 |
| 4,559,586 | 12/1985 | Slarve | 362/72 |
| 4,891,736 | 1/1990 | Gouda | 362/72 |
| 5,040,099 | 8/1991 | Harris | 362/72 |

FOREIGN PATENT DOCUMENTS 1468323  3/1977  United Kingdom ............... 340/475

Primary Examiner—Ira S. Lazarus
Assistant Examiner—Y. Quach

[57] ABSTRACT

An illuminated motorcycle helmet is provided for an operator of a motorcycle having a lighting system, which consists of a head covering of hard material, worn to protect the head of the operator of the motorcycle. An auxiliary lighting system is built into the head covering. A mechanism is for detachably connecting an electric circuit from the lighting system in the motorcycle to the auxiliary lighting system. When the operator activates the lighting system in the motorcycle, the auxiliary lighting system will simultaneously be activated on the head covering, which will be more visually seen from all angles about the motorcycle for added safety.

1 Claim, 1 Drawing Sheet

MOTORCYCLE HELMET WITH HEADLIGHTS

BACKGROUND OF THE INVENTION

The instant invention relates generally to protective headgear and more specifically it relates to an illuminated motorcycle helmet with a built-in auxiliary lighting system which provides more visibility from all angles about the motorcycle for added safety.

There are available various conventional protective headgear which do not provide the novel improvements of the invention herein disclosed.

SUMMARY OF THE INVENTION

A primary object of the present invention is to provide an illuminated motorcycle helmet that will overcome the shortcomings of the prior art devices.

Another object is to provide an illuminated motorcycle helmet with a built-in auxiliary lighting system that is electrically connected in conjunction to the motorcycle lighting system which produces more visibility from all angles about the motorcycle for added safety.

An additional object is to provide an illuminated motorcycle helmet with a built-in auxiliary lighting system that is electrically connected to the motorcycle lighting system by a keyed male plug and female socket to prevent an incorrect connection therebetween.

A further object is to provide an illuminated motorcycle helmet that is simple and easy to use.

A still further object is to provide an illuminated motorcycle helmet that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
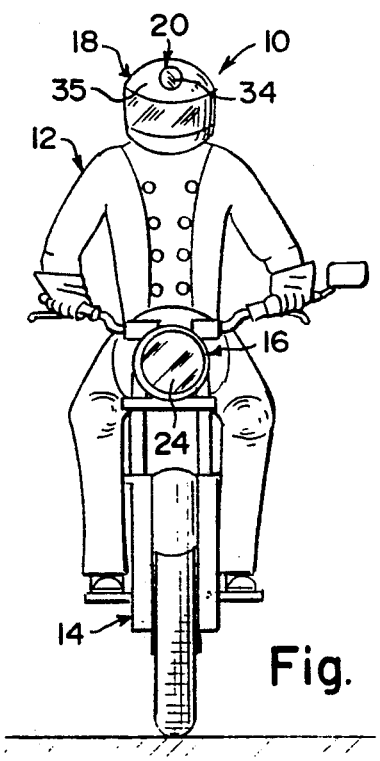
FIG. 1 is a front view of a motorcycle carrying an operator with the instant invention installed thereon.

Turning now descriptively to the drawings, in which similar reference characters denote similar elements throughout the several views, the Figures illustrate an illuminated motor cycle helmet 10 for an operator 12 of a motorcycle 14 having a lighting system 16, which consists of a head covering 18 of hard material, worn to protect the head of the operator 12 of the motorcycle 14. An auxiliary lighting system 20 is built into the head covering 18. A mechanism 22 is for detachably connecting an electric circuit 23 from the lighting system 16 in the motorcycle 14 to the auxiliary lighting system 20. When the operator 12 activates the lighting system 16 in the motorcycle 14, the auxiliary lighting system 20 will simultaneously be activated on the head covering 18, which will be more visually seen from all angles about the motorcycle 14 for added safety.

The lighting system 16 in the motorcycle 14 has a headlight 24, a left turn signal light 26, a right turn signal light 28, a tail light 30 and a stop light 32. The auxiliary lighting system 20 includes an auxiliary headlight 34 located at a front portion 35 of the head covering 18. An auxiliary left turn signal light 36 is located at a left side portion 38 of the head covering 18. An auxiliary right turn signal light 40 is located at a right side portion 42 of the head covering 18. An auxiliary tail light 44 is located at a rear portion 46 of the head covering 18. An auxiliary stop light 48 is located at the rear portion 46 of the head covering 18. The detachably connecting mechanism 22 will electrically connect through the electric circuit 23, the headlight 24 to the auxiliary headlight 34, the left turn signal light 26 to the auxiliary left turn signal light 36, the right turn signal light 28 to the auxiliary right turn signal light 40, the tail light 30 to the auxiliary tail light 44 and the stop light 32 to the auxiliary stop light 48. The detachably connecting mechanism 22 includes a first power cord 50 electrically connected at a first end 52 to the auxiliary lighting system 20. A male plug 54 having a plurality of contact blades 56 is electrically connected to a second end 58 of the first power cord 50. A female socket 60 having a plurality of contact slots 62 is engagable with the contact blades 56 in the male plug 54. A second power cord 64 is electrically connected at a first end 66 to the contact slots 62 of the female socket 60 and at a second end 68 to the lighting system 16 in the motorcycle 14.

Figure 3:
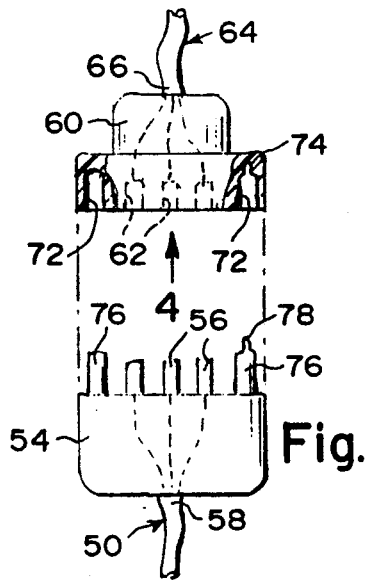
FIG. 3 is an exploded elevational view with parts broken away of a modified keyed male plug and female socket.
Figure 4:
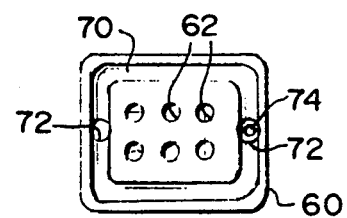
FIG. 4 is a view taken in direction of arrow 4 in FIG. 3 showing the track within the female socket.
Figure 2:
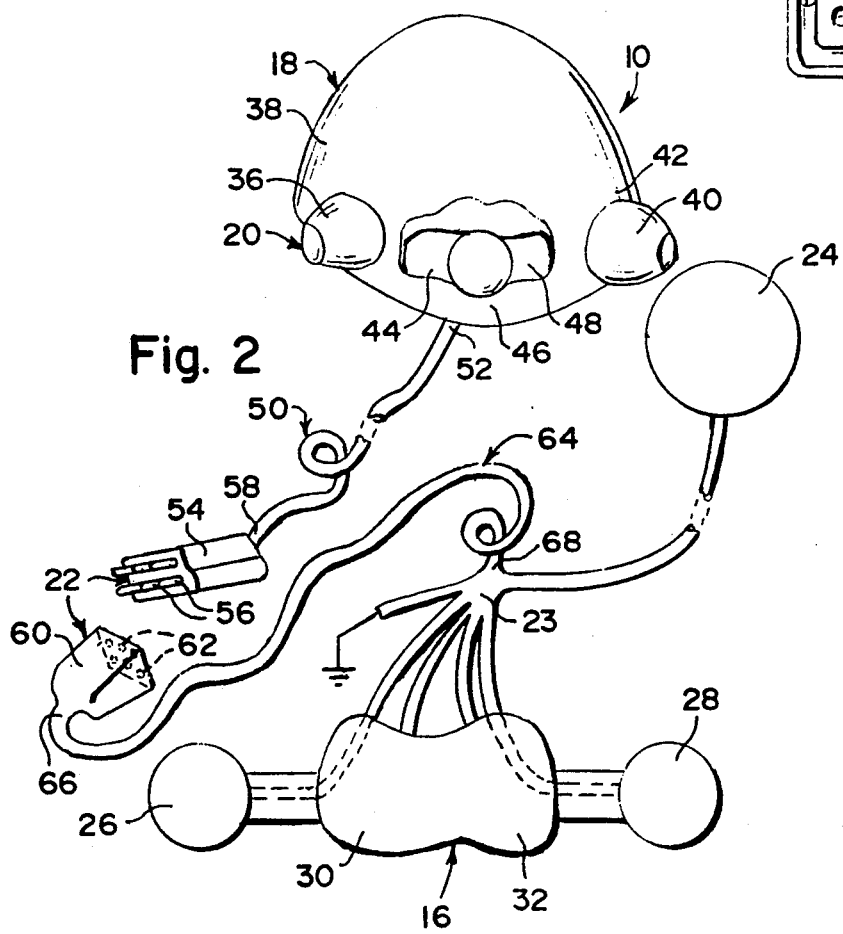
FIG. 2 is a diagrammatic perspective view of the instant invention per se.

As shown in FIGS. 3 and 4, the female socket 60 has a shallow continuous track 70 about the contact slots 62 and a pair of oppositely spaced apart bores 72 extending inwardly in the track 70, with one of the bores 72 having a small aperture 74 extending further inwardly therefrom. The male plug 54 has a pair of non-conductive prongs 76, which are longer than the contact blades 56 and are oppositely spaced apart with respect to the blades 56. One of the prongs 76 has a small pin 78 extending therefrom, so that the prongs 76 can slide within the track 70 until the prong 76 with the small pin 78 is properly positioned into the bore 72 with the small aperture 74. This will insure that the contact blades 56 are in the right position with respect to the contact slots 62 in the female socket 60.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An illuminated motorcycle helmet for an operator of a motorcycle having a lighting system, which comprises:
    a) a head covering of hard material, worn to protect the head of an operator of the motorcycle;
    b) an auxiliary lighting system built into said head covering; and
    c) means for detachably connecting an electric circuit from the lighting system in the motorcycle to said auxiliary lighting system, so that when the operator activates the lighting system in the motorcycle, said auxiliary lighting system will simultaneously be activated on said head covering, which will be more visually seen from all angles about the motorcycle for added safety; wherein the lighting system of the motorcycle has a headlight, a front left turn signal light, a front right turn signal light, a tail light and a stop light, wherein said auxiliary lighting system further includes:

d) an auxiliary headlight located at a front portion of said head covering;

e) an auxiliary front left turn signal light extending from a front left side portion of said head covering;

f) an auxiliary front right turn signal light extending from a front right side portion of said head covering;

g) an auxiliary tail light located at a rear portion of said head covering; and h) an auxiliary stop light located at the rear portion of said head covering, whereby said detachably connecting means will electrically connect through the electric circuit, the headlight to said auxiliary headlight, the front left turn signal light to said auxiliary front left turn signal light, the right turn signal light to said auxiliary front right turn signal light, the tail light to said auxiliary tail light and the stop light to said auxiliary stop light; wherein said detachably connecting means includes:

i) a first power cord electrically connected at a first end to said auxiliary lighting system;

j) a male plug having a plurality of contact blades electrically connected to a second end of said first power cord;

k) a female socket having a plurality of contact slots engagable with said plurality of contact blades in said male plug;

l) a second power cord electrically connected at a first end to said plurality of contact slots of said female socket and at a second end to the lighting system in the motorcycle; and m) aligning means insuring proper alignment of said plurality of contact blades and slots; wherein said aligning means comprises:

n) said female socket having a shallow continuous track about the plurality of contact slots and a pair of oppositely spaced apart bores extending inwardly in the shallow continuous track, with one of the bores having a small aperture extending further inwardly therefrom; and o) said male plug having a pair of non-conductive prongs which are longer than said plurality of contact blades and are oppositely spaced apart with respect to said plurality of contact blades, with one of said non-conducting prongs having a small pin extending therefrom, so that said pair of non-conducting prongs can slide within said shallow continuous track until said small pin is properly positioned into the bore with the small aperture so as to insure that said plurality of contact blades are in the right position with respect to the said plurality of contact slots in said female socket.

* * * * *